Oct. 12, 1926.  
C. C. HANSEN  
1,602,901  
SHANK AND BIT PUNCH  
Filed August 24, 1925

INVENTOR  
*Charles C. Hansen*  
BY  
HIS ATTORNEY

Patented Oct. 12, 1926.

1,602,901

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

SHANK AND BIT PUNCH.

Application filed August 24, 1925. Serial No. 52,135.

This invention relates to shank and bit punches, but more particularly to an improved form of punch in which the punch pin is driven into the drill steel to open the bore of the steel by means of a fluid actuated piston which delivers a heavy blow of impact to the pin and at the same time continues thereafter to force the pin into the steel by pressure applied thereto. On withdrawing the pin from the steel a heavy blow is delivered to the pin in the opposite direction and pressure is also applied to the pin. By this means the pin is both hammered and pressed into the drill steel and hammered and pressed out of the drill steel by one and the same agency since the hammer piston constitutes both a hammer and an air feed operating in the same manner in both directions.

Further objects of the invention will hereinafter appear and the invention is shown in one of its preferred forms in the accompanying drawings, in which—

Figure 1:
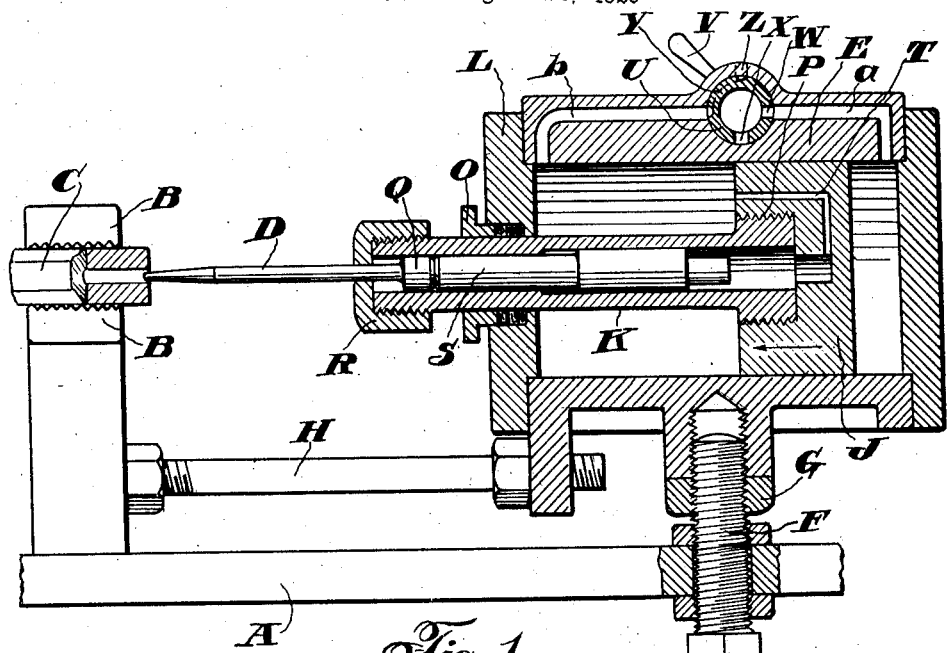
Figure 2:
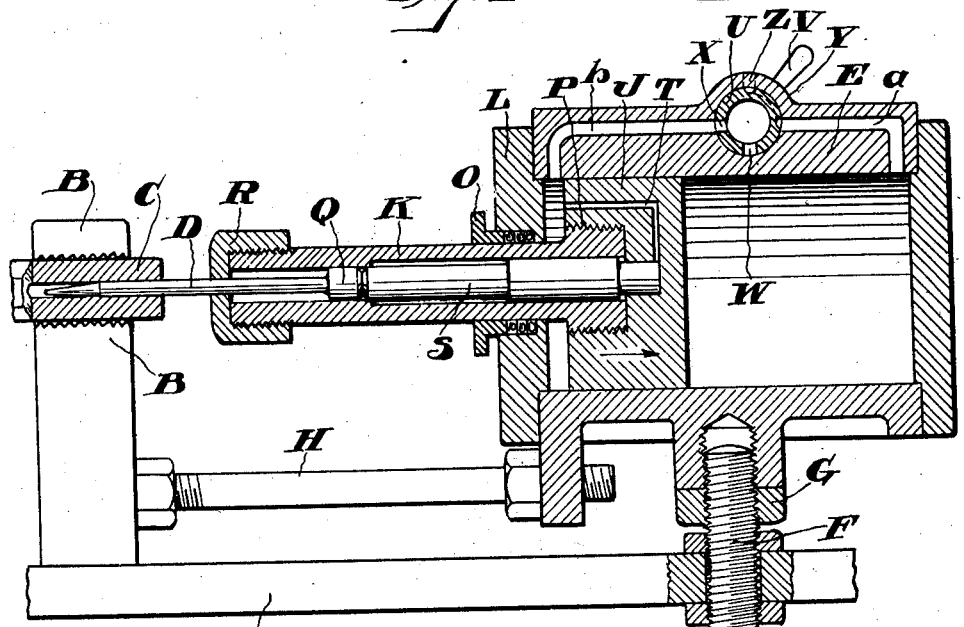

Figure 1 is an elevation partly in longitudinal section showing the pin about to enter the drill steel, and Figure 2 is a similar view showing the pin about to be withdrawn from the drill steel.

Referring to the drawings, the base A is provided with the clamping jaws B for holding the drill steel C, and the punch pin D is adapted to be both hammered and forced into and out of the hollow bore of the steel.

Obviously, the punching mechanism may be mounted on a bracket at one side of a drill sharpener and the jaws B may be the usual supplemental jaws provided on the main clamping jaws of a drill sharpener, as illustrated in U. S. Patent No. 1,304,459 granted May 20, 1919, to Jesse Ditson for drill sharpener, in which patent a push punch is illustrated mounted at the side of a drill sharpener in the usual manner and the drill steel is held in supplementary clamping jaws at one side of the member axis of the sharpener. In another form of the apparatus the base A may be a separate pedestal and the clamping jaws B may be carried on said pedestal.

A cylinder E is secured to the base A as by means of the screw F and lock nut G and braced by means of the tie rod H, being understood that this construction is merely illustrative and shown diagrammatically for simplicity.

A hammer piston J reciprocates in the cylinder E and is provided with a forwardly extending shank K shown in this instance as extending through the front head L of the cylinder and provided with a stuffing box O. The shank K may be separated from the head of the piston and the two parts may be united as by means of the screw threads P. The piston shank K is preferably hollow and the pin D is movably mounted within said hollow bore. The head Q of the pin is held in the bore as by means of the screw threaded cap R which also forms an abutment adapted to strike against the head of the pin to impart a blow of impact thereto for withdrawing the pin from the drill steel. A cylindrical impact member S is also located within the hollow bore of the piston shank and transmits blows of impact from the piston J to the head Q of the pin in the opposite direction for driving the pin into the steel.

A passage T in the piston J is for the purpose of venting the hollow shank to atmosphere and preventing a fluid cushion inside the shank when the pin is to be driven forward.

Pressure fluid is supplied to the machine through the hollow bore of the controlling valve U controlled by the handle V and this valve as shown is a two way valve having the ports W and X constituting inlet ports and the port Y constituting an exhaust port adapted to cooperate with the exhaust port Z in the valve casing. The inlet ports W and X cooperate with the combined inlet and exhaust passages $a$ and $b$ leading to the ends of the cylinder. By turning the valve to the position indicated in Figure 1 motive fluid passes through the passage $a$ to the rearward end of the cylinder to drive the piston forward and the passage $b$ affords communication between the forward end of the cylinder and the exhaust port Z. In the reverse position of the valve shown in Figure 2 the rearward end of the cylinder is open to atmosphere and pressure fluid is being admitted to the forward end of the cylinder.

In the operation of the device let it be assumed that the parts are in the position indicated in Figure 1 in which the piston J is starting on its forward stroke and the pin D is about to enter the drill steel. As the piston J is suddenly driven forward and comes in contact with the rearward end of the impact member S a blow of impact or shock is imparted directly to the pin D and the cylinder E is of such size and diameter and the piston J is of such weight that one strong blow is designed to be sufficient to drive the pin the required distance into the bit end or the shank end of a hollow drill steel to open the bore, it being assumed at the same time that the pressure behind the piston will assist the force of the blow imparted to the pin and act as an air feed pushing the pin into the steel for an instant of time after the blow is delivered. Upon reversing the valve U by means of the lever V this operation is repeated in a reversed direction and the cap R on the end of the piston is brought against the head Q of the pin with the shock of impact designed to be sufficient to withdraw the pin from the drill steel aided by the continued pressure of the motive fluid against the piston on its rearward stroke.

Obviously, if one forward blow aided by the pressure of the piston is not sufficient to drive the pin the desired distance into the drill steel. the valve handle V may be quickly thrown over and brought back again one or more times to deliver repeated blows of impact to drive the pin into the steel. Similarly repeated blows for driving the pin out of the drill steel may be imparted to the pin by manipulating the lever back and forth.

By means of this improved device a simple and efficient shank and bit punch is obtained of sufficient power to quickly drive the pin into the steel and drive it out of the steel before the pin becomes hot and bent and without breaking.

I am aware of the U. S. Patent No. 1,214,070 granted June 30, 1917, to T. H. Proske for apparatus for forming lugs upon a drill steel, in which a punching mechanism for opening the bore of a drill steel is shown illustrated more particularly in Figures 1, 8, 9 and 15 and although mistakes seem to have been made in the specification particularly on page 1 of the printed patent lines 99 to 112 and on page 2 of the printed patent lines 45 to 65 which portions of the specification do not agree. I am aware that the true interpretation of this patent is to the fact that the tappet 19 connected to the piston shaft 16 is separate from the punch pin 21, in which case the tappet 19 actuated by the piston 14 in the cylinder 15 would impart a blow of impact or repeated blows of impact to the punch pin 21 according to the manipulation of the throttle, such to be provided in the casing 37. A blow of impact or repeated blows of impact would likewise be imparted to the pin 21 by the cap 24 in the opposite direction for hammering the pin out of the drill steel depending upon the manipulation of the aforesaid throttle, and I do not claim the construction disclosed by the said Proske in said patent.

I claim:

1. In a shank and bit punch, means for clamping a drill steel, a pin adapted to enter the drill steel, and a fluid actuated piston adapted to impart a single heavy preliminary blow of impact to the pin in one direction or the other sufficient to hammer the pin into the steel and hammer the pin out of the steel, including means for subjecting said piston to direct and continued pressure in the direction of the blow after such blow has been delivered to assist the hammer action, and a hand operated valve for controlling the movements of the piston.

2. In a shank and bit punch, the combination of means for clamping a drill steel, a pin adapted to enter the drill steel, a cylinder and reciprocating piston, said piston having a forwardly extending hollow shank, said pin being longitudinally movable within said shank, and means for causing the piston to impart a single blow of impact to the pin in one direction or the other to hammer the pin into the steel followed by continued pressure against the piston to push against the pin and assist the hammer action, and to hammer the pin out of the steel by another blow in the opposite direction, a hand operated controlling valve, and pressure fluid connections whereby the piston follows the movements of the said valve.

3. In a shank and bit punch, the combination of means for clamping a drill steel, a pin adapted to enter the drill steel, a cylinder and reciprocating piston, said piston having a forwardly extending hollow shank, said pin being longitudinally movable within said shank, and an impact member within the hollow shank of the piston between the pin and the piston head, and means for causing the piston to impart a single blow of impact to the said impact member and thence to the pin in one direction to hammer the pin into the steel followed by continued pressure against the piston to push against the pin and assist the hammer action and to hammer the pin out of the steel by another blow in the opposite direction directly against the pin followed by continuous pressure against the pin.

In testimony whereof I have signed this specification.

CHARLES C. HANSEN.